US007834763B2

(12) United States Patent
Ishikawa (10) Patent No.: US 7,834,763 B2
(45) Date of Patent: Nov. 16, 2010

(54) WIRELESS TAG READER/WRITER CONTROL SYSTEM AND WIRELESS TAG READER/WRITER CONTROL METHOD

(75) Inventor: Atsushi Ishikawa, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/043,344

(22) Filed: Mar. 6, 2008

(65) Prior Publication Data

US 2009/0002170 A1  Jan. 1, 2009

(30) Foreign Application Priority Data

Jun. 29, 2007  (JP) ............... 2007-172668

(51) Int. Cl.
G08B 13/00 (2006.01)
(52) U.S. Cl. ............... 340/572.1; 340/10.1; 340/10.5
(58) Field of Classification Search ........... 340/572, 340/10, 505
See application file for complete search history.

(56) References Cited

U.S. PATENT DOCUMENTS

| | | | |
|---|---|---|---|
| 7,301,458 B2 * | 11/2007 | Carrender et al. | 340/572.1 |
| 2006/0213992 A1 | 9/2006 | Ishikawa | |
| 2006/0214796 A1 | 9/2006 | Ishikawa | |
| 2006/0214800 A1 | 9/2006 | Ishikawa | |
| 2006/0255941 A1 * | 11/2006 | Carrender et al. | 340/572.1 |
| 2007/0099623 A1 * | 5/2007 | Stephensen et al. | 455/446 |
| 2007/0182560 A1 | 8/2007 | Mori et al. | |
| 2008/0309490 A1 * | 12/2008 | Honkanen et al. | 340/572.1 |
| 2009/0009336 A1 | 1/2009 | Ishikawa | |
| 2009/0015408 A1 | 1/2009 | Asai et al. | |
| 2009/0305637 A1 * | 12/2009 | Jang et al. | 455/63.1 |

FOREIGN PATENT DOCUMENTS

| | | |
|---|---|---|
| JP | 2002-245417 | 8/2002 |
| JP | 2005-102215 | 4/2005 |

OTHER PUBLICATIONS

Notification No. 49 of the Minister of Posts and Telecommunications According to Article 49-9 of Regulations for radio equipment based on the Radio Law.
Notification No. 385 of the Minister of Posts and Telecommunications According to Article 49-14 of Regulations for radio equipment based on Radio Law.

* cited by examiner

Primary Examiner—Travis R Hunnings
(74) Attorney, Agent, or Firm—Turocy & Watson, LLP (57) ABSTRACT

A wireless tag reader/writer control system includes a control apparatus for controlling a plurality of wireless tag readers/writers transmitting a signal to and receiving a signal from a wireless tag by transmitting an electromagnetic wave radiation execution timing arrangement including the time span authorized to radiate an electric wave at a time and the radiation time intervals between radiations of electric wave to each of the wireless tag readers/writers and a plurality of wireless tag readers/writers, each having a reader/writer main body for transmitting a signal to and receiving a signal from a wireless tag and receiving the execution of radiation time intervals between radiations of electric wave from the control apparatus. The control apparatus is adapted to transmit the execution of radiation time intervals between radiations of electromagnetic wave to each of the wireless tag readers/writers and each of the wireless tag readers/writers is adapted to radiate an electromagnetic wave according to the received execution of radiation time intervals.

14 Claims, 6 Drawing Sheets

Fig. 4
EXECUTION TABLE 201

| DAY OF WEEK 202 | CLOCK TIME 203 | | GATE A 204 | | GATE B 205 | | HANDY A 206 | | HANDY B 207 | | |
|---|---|---|---|---|---|---|---|---|---|---|---|
| | FROM | TO | on | off | on | off | on | off | on | off | |
| MON | 9:00 | 12:00 | 3 | 0.5 | 1 | 0.5 | 0.5 | 2 | 0.5 | 3 | ... |
| | 12:00 | 17:00 | 0.5 | 3 | 0.5 | 1 | 2 | 0.5 | 3 | 0.5 | |
| | 17:00 | 19:00 | 3 | 0.5 | 1 | 0.5 | 0.5 | 2 | 0.5 | 3 | |
| : | : | : | : | : | : | : | : | : | : | : | |

Fig. 5
COUNT TABLE 301

| DAY OF WEEK 302 | CLOCK TIME 303 | | GATE A 304 | GATE B 305 | HANDY A 306 | HANDY B 307 | |
|---|---|---|---|---|---|---|---|
| | FROM | TO | | | | | |
| MON | 9:00 | 12:00 | 10 | 2 | 4 | 2 | ... |
| | 12:00 | 17:00 | 3 | 5 | 20 | 15 | |
| | 17:00 | 19:00 | 12 | 1 | 2 | 1 | |
| : | : | : | : | : | : | : | |

Fig. 6
READER/WRITER SIDE EXECUTION TABLE 401

| on 402 | off 403 |
|---|---|
| 3 | 0.5 |

Fig. 7

CONTROL OF ELECTRIC WAVE RADIATION TIME INTERVALS TO BE EXECUTED BY CLOCK TIME

Fig. 8
CONTROL OF ELECTRIC WAVE RADIATION TIME INTERVALS
TO BE EXECUTED BY NUMBER OF READ WIRELESS TAGS

WIRELESS TAG READER/WRITER CONTROL SYSTEM AND WIRELESS TAG READER/WRITER CONTROL METHOD

CROSS-REFERENCE TO RELATED APPLICATIONS

This application is based upon and claims the benefit of priority from the prior Japanese Patent Application No. 2007-172668, filed on 29 Jun. 2007, the entire contents of which are incorporated herein by reference.

BACKGROUND OF THE INVENTION

1. Field of the Invention

This invention relates to a wireless tag reader/writer control system and a wireless tag reader/writer control method for controlling the electromagnetic wave radiation time intervals of a wireless tag reader/writer for transmitting a signal to and receiving a signal from a wireless tag.

2. Description of the Related Art

When two or more than two wireless tag reader/writers radiate an electromagnetic wave simultaneously, an interference of electromagnetic waves takes place among the electromagnetic waves radiated from the wireless tag readers/writers. This problem can be avoided by allocating different frequency bands to the wireless tag readers/writers.

However, the number of frequency bands that are available to wireless tag reader/writers adapted to communicate with wireless tags for communications is limited. In other words, the number of wireless readers/writers that can be operated at the same time within a limited geographical area is limited.

With regard to this problem, it is an authorized common practice that, when a wireless tag reader/writer receives an electromagnetic wave radiated from some other wireless tag reader/writer, the former wireless tag reader/writer does not emit any electromagnetic wave (see, for example, "Notification No. 49 of the Minister of Posts and Telecommunications According to Article 49-9 of Regulations for radio equipment based on the Radio Law" (to be referred to as Non-Patent Document 1 hereinafter) and "Notification No. 385 of the Minister of Posts and Telecommunications According to Article 49-14 of Regulations for radio equipment based on Radio Law" (to be referred to as Non-Patent Document 2 hereinafter)). Techniques for selectively controlling the antennas radiating an electromagnetic wave among a plurality of antennas of wireless tag reader/writers have been proposed (see, for example, JP-A 2002-245417 (to be referred to as Patent Document 1 hereinafter)). Techniques for providing a wireless tag with a flag in order to prevent reading errors from taking place once the wireless tag is read in by a wireless tag reader/writer in order to indicate that the wireless tag is read into the internal non-volatile memory of the wireless tag reader/writer (see, for example, JP-A 2005-102215 (to be referred to as Patent Document 2 hereinafter)).

However, the techniques described in Non-Patent Document 1, Non-Patent Document 2 and Patent Document 1 cannot dissolve the problem of interference of electromagnetic waves when a plurality of wireless tag readers/writers is operated within a limited geographical area.

The technique described in Patent Document 2 is accompanied by a problem that the number of wireless tag readers/writers that are operated at the same time can seldom be detected and hence it is not practically feasible to provide flags for so many wireless tag readers/writers.

BRIEF SUMMARY OF THE INVENTION

It is an object of the present invention to provide a wireless tag reader/writer control system and a wireless tag reader/writer control method that can prevent a plurality of wireless tag readers/writers being operated within a limited geographical area from causing interferences of electromagnetic waves.

In an aspect of the present invention, a wireless tag reader/writer control system includes: a control apparatus for controlling a plurality of wireless tag readers/writers transmitting a signal to and receiving a signal from a wireless tag by transmitting an electromagnetic wave radiation execution timing arrangement including the time span authorized to radiate an electric wave at a time and the radiation time intervals between radiations of electric wave to each of the wireless tag readers/writers; and a plurality of wireless tag readers/writers, each having a reader/writer main body for transmitting a signal to and receiving a signal from a wireless tag and receiving the execution of radiation time intervals between radiations of electromagnetic wave from the control apparatus; the control apparatus being adapted to transmit the execution of radiation time intervals between radiations of electromagnetic wave to each of the wireless tag readers/writers; each of the wireless tag readers/writers being adapted to radiate an electromagnetic wave according to the received execution of radiation time intervals.

DETAILED DESCRIPTION OF THE INVENTION

Throughout this description, the embodiments and examples shown should be considered as exemplars, rather than limitations on the apparatus and methods of the present invention.

Now, a wireless tag reader/writer control system and a wireless tag reader/writer control method according to the present invention will be described in greater detail by referring to the accompanying drawings that schematically illustrate an embodiment of wireless tag reader/writer control system and an embodiment of wireless tag reader/writer control method according to the present invention. For the purpose of the present invention, a wireless tag reader/writer may be an apparatus adapted to read information from a wireless tag, an apparatus adapted to write information onto a wireless tag or an apparatus adapted to read information from and write information onto a wireless tag. A wireless tag is a wirelessly communicable recording medium that normally has an antenna and an IC chip. A wireless tag may additionally have a computation feature. It is preferably portable and may be of a micro size. A wireless tag may also be referred to as RFID (radio frequency identification).

Outline of Embodiments

The embodiment of wireless tag reader/writer control system includes: a control apparatus for controlling a plurality of wireless tag readers/writers transmitting a signal to and receiving a signal from a wireless tag by transmitting an electromagnetic wave radiation execution timing arrangement including the time span authorized to radiate an electric wave at a time and the radiation time intervals between radiations of electric wave to each of the wireless tag readers/writers; and a plurality of wireless tag readers/writers, each having a reader/writer main body for transmitting a signal to and receiving a signal from a wireless tag and receiving the execution of radiation time intervals between radiations of electromagnetic wave from the control apparatus, wherein the control apparatus is adapted to transmit the execution of radiation time intervals between radiations of electromagnetic wave to each of the wireless tag readers/writers and each of the wireless tag readers/writers is adapted to radiate an electromagnetic wave according to the received time intervals.

The embodiment of wireless tag reader/writer control method is to be used for a wireless tag reader/writer control system including: a control apparatus for controlling a plurality of wireless tag readers/writers transmitting a signal to and receiving a signal from a wireless tag by transmitting an electromagnetic wave radiation execution timing arrangement including the time span authorized to radiate an electric wave at a time and the radiation time intervals between radiations of electric wave to each of the wireless tag readers/writers and a plurality of wireless tag readers/writers, each having a reader/writer main body for transmitting a signal to and receiving a signal from a wireless tag and receiving the execution of radiation time intervals between radiations of electromagnetic wave from the control apparatus, wherein the control apparatus is adapted to transmit the execution of radiation time intervals between radiations of electromagnetic wave to each of the wireless tag readers/writers and each of the wireless tag readers/writers is adapted to alter the time span for radiating an electromagnetic wave according to the received time intervals.

Thus, in the embodiment of wireless tag reader/writer control system and that of wireless tag reader/writer control method, the control apparatus is adapted to shift the time intervals between radiations of electromagnetic wave of each of the wireless tag readers/writers.

Details of Embodiments

Configuration of Wireless Tag Reader/Writer Control System

Figure 1:
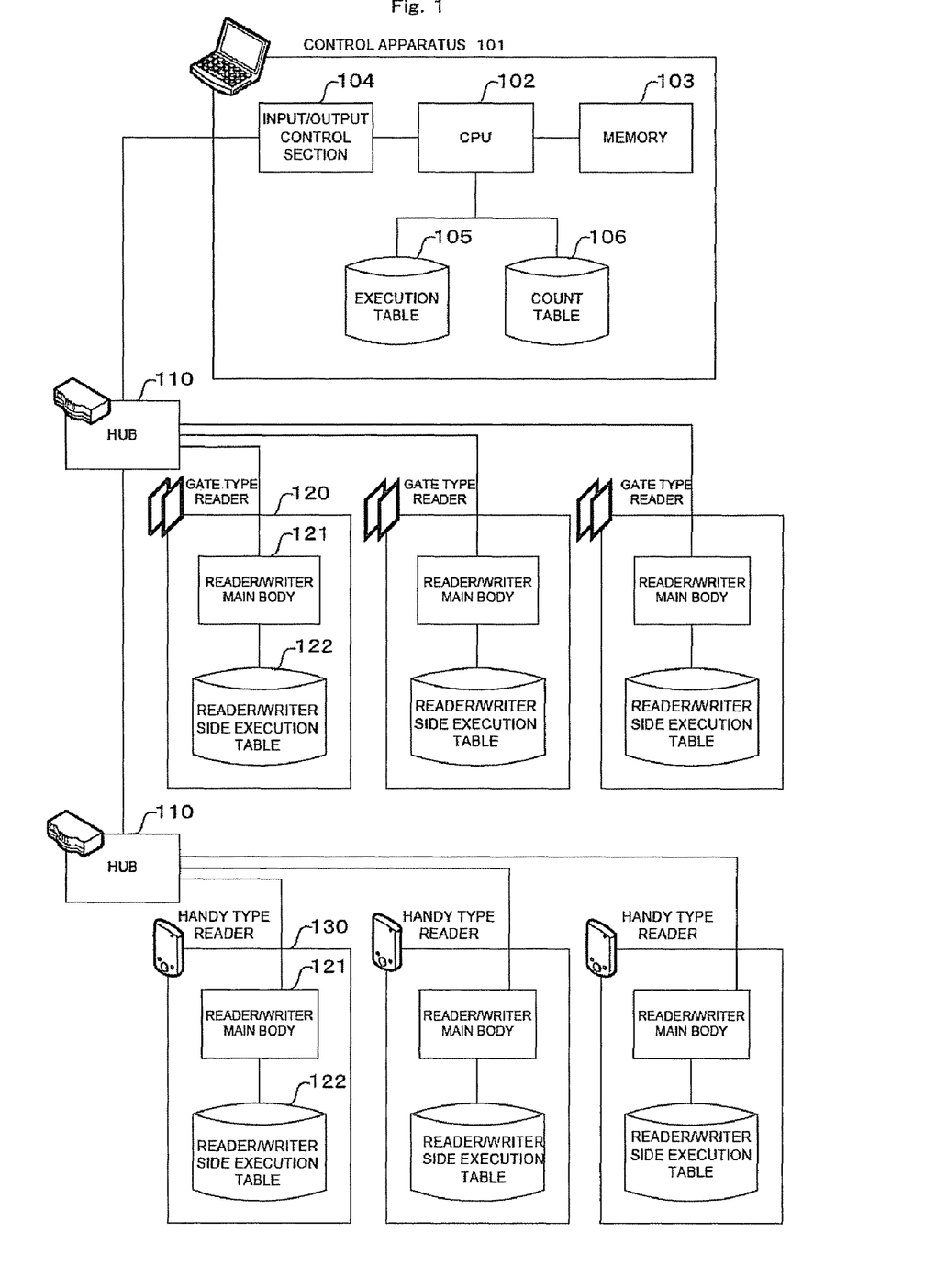
FIG. 1 is a schematic block diagram of a configuration of a wireless tag reader/writer control system according to an embodiment of the present invention.

FIG. 1 is a schematic block diagram of a wireless tag reader/writer control system according to the embodiment. As shown in FIG. 1, the wireless tag reader/writer control system of this embodiment includes a control apparatus 101 for transmitting signals to and receiving signals from a plurality of wireless tag readers/writers 120, 130, each of which is adapted to transmit a signal to and receive a signal from a wireless tag, and that includes an execution table 105 storing an electromagnetic wave radiation execution timing arrangement including the time span authorized to radiate an electric wave at a time and the radiation time intervals between radiations of electric wave of each of the wireless tag readers/writers 120, 130 during which the wireless tag reader/writer does not transmit any electromagnetic wave and a plurality of wireless tag readers/writers 120, 130, each of which has a reader/writer main body 121 for transmitting a signal to and receiving a signal from a wireless tag and also transmitting a signal to and receiving a signal from the control apparatus and a reader/writer side execution table 122 storing the execution of radiation time intervals.

The control apparatus 101 additionally has a CPU 102 that is a processor for executing arithmetic processes, a memory 103 for storing information and an input/output control section 104 for transmitting signals to and receiving signals from external apparatus. In other words, the control apparatus 101 may be formed by using a popular personal computer or server. The control apparatus 101 may additionally have a count table 106 storing the number of wireless tags that each of the wireless tag readers/writers 120, 130 has read.

Each of the wireless tag readers/writers may be formed by using a gate type wireless tag reader/writer (which is referred to simply as gate type reader in FIG. 1) or a handy type wireless tag reader/writer (which is referred to simply as handy type reader in FIG. 1), although the present invention is by no means limited thereto.

A large number of wireless tag readers/writers 120, 130 can be connected by means of hubs 110.

Wireless Tag and Wireless Tag Reader/Writer of Embodiment

Figure 2:
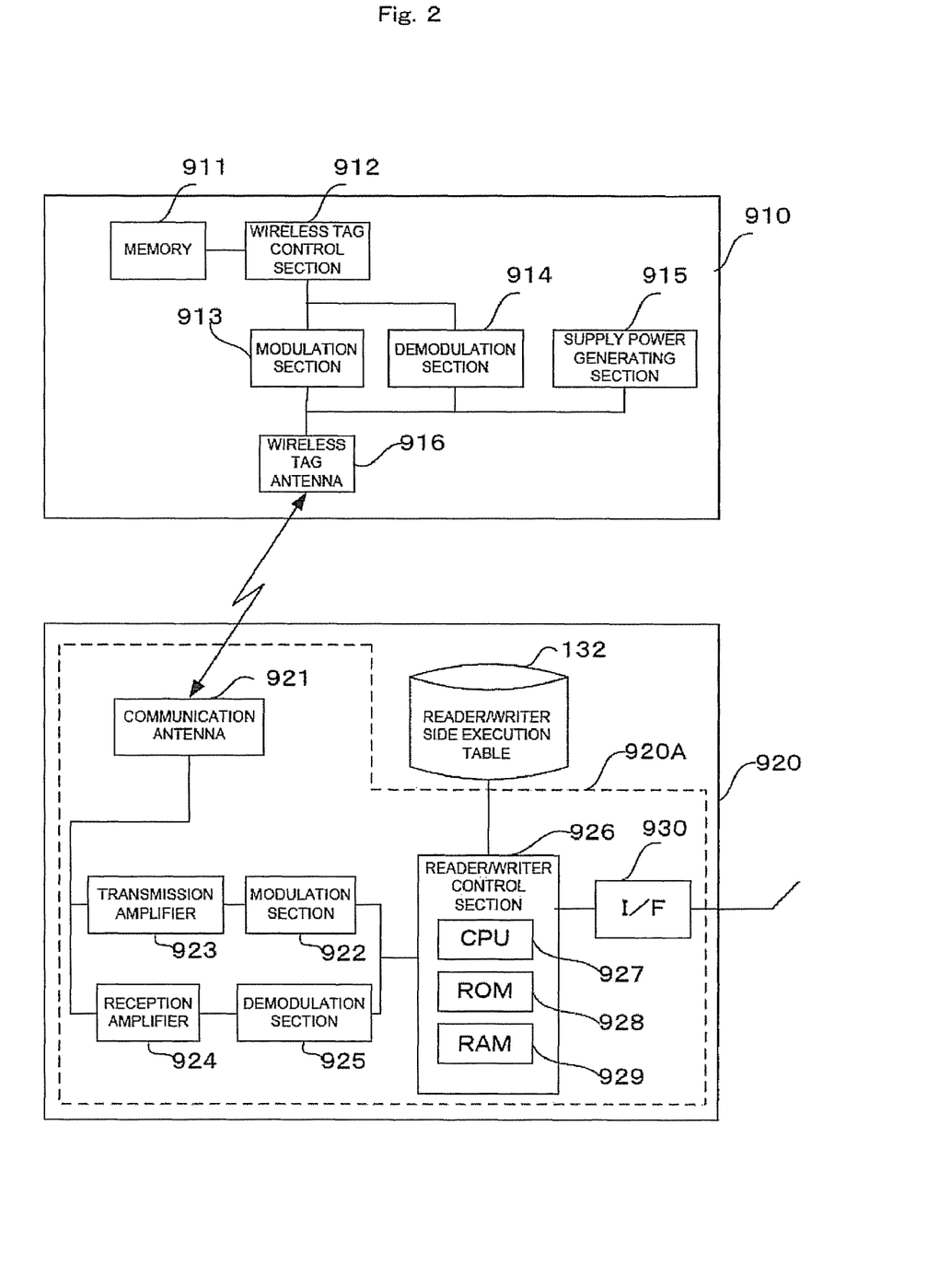
FIG. 2 is a schematic block diagram of a wireless tag and a wireless tag reader/writer according to the embodiment.

Now, a wireless tag and a wireless tag reader/writer that can be used for this embodiment will be described below. FIG. 2 is a schematic block diagram of a wireless tag and a wireless tag reader/writer belonging to this embodiment, showing the configuration thereof.

The wireless tag 910 has a memory 911 that is a storage device, a wireless tag control section 912 for reading data from and writing data to the memory 911, a supply power generating section 915 for supplying power by rectifying and stabilizing the modulated electromagnetic wave it receives, a modulation section 913 for modulating the data sent out from the wireless tag control section 912 and sending them to a wireless tag antenna 916 and a demodulation section 914 for demodulating the modulated electromagnetic wave it receives and sending it out to the wireless tag control section 912.

The wireless tag reader/writer 920 of this embodiment has a reader/writer main body section 920a and a reader/writer side execution table 132.

The reader/writer main body section 920a has a communication antenna 921 that is an antenna for transmitting a signal to and receiving a signal from a wireless tag by means of an electromagnetic wave, a reader/writer control section 926 for controlling the communication with the wireless tag 910 and the hardware to be connected to it, a modulation section 922 for modulating the data sent out from the reader/writer control section 926, a transmission amplifier 923 for amplifying the modulated signal and sending it out to the communication antenna 921, a reception amplifier 924 for amplifying the modulated electromagnetic wave it receives, a demodulation section 925 for demodulating the modulated signal it receives and an interface 930 for connecting the wireless tag reader/writer 920 to a host apparatus such as a personal computer and exchanging data with the latter. The reader/writer control section 926 by turn has a CPU 927, a ROM 928 and a RAM 929, the ROM 929 and the RAM 929 being provided to store data.

The reader/writer side execution table 132 may be arranged in the inside of an external memory device or in the inside of the RAM 929.

Operation of Wireless Tag Reader/Writer Control System

Altering Time Intervals of Radiations of Electromagnetic Wave of Each Wireless Tag Reader/Writer With the wireless tag reader/writer control system of this embodiment and the wireless tag reader/writer control method of this embodiment, the control apparatus is adapted to alter the time intervals of radiations of electric wave of each wireless tag reader/writer. Now, the method of shifting the time intervals will be summarily described below.

Figure 3A:
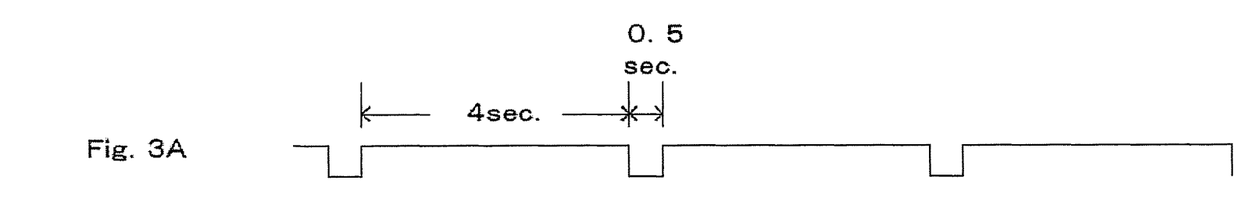
FIG. 3A is a graph illustrating the time intervals of radiations of electromagnetic wave when a wireless tag reader/writer is operating alone.
Figure 3B:
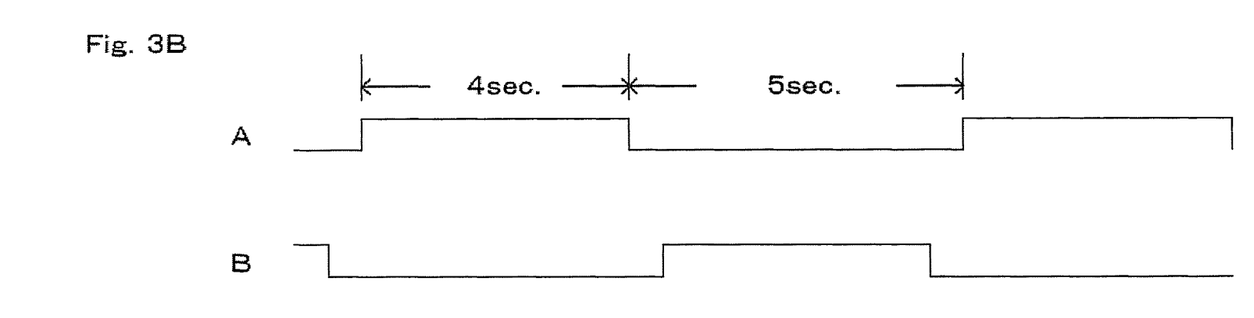
FIG. 3B is a graph illustrating the time intervals of radiations of electromagnetic waves when two wireless tag readers/writers A and B are operating.
Figure 3C:
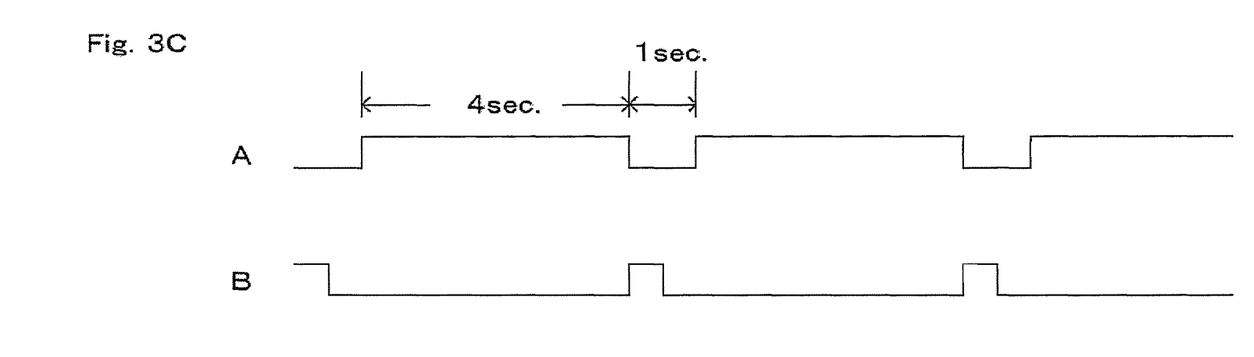
FIG. 3C is a graph illustrating the time intervals of radiation of electromagnetic waves when two wireless tag readers/writers A and B of the wireless tag reader/writer control system of this embodiment are operating.

FIGS. 3A through 3C schematically illustrate time intervals of radiations of electric wave of the wireless tag reader/writer 120 and those of the wireless tag reader/writer 130. FIG. 3A is a graph illustrating the time intervals of radiations of electric wave when a wireless tag reader/writer is operating alone. FIG. 3A illustrates that the wireless tag reader/writer is adapted to radiate an electric wave for 4 seconds and then suspend the radiation of electric wave for 0.5 seconds.

FIG. 3B is a graph illustrating the time intervals of radiations of electric waves when two wireless tag readers/writers A and B are operating. Referring to FIG. 3B, the wireless tag reader/writer A radiates an electric wave for 4 seconds and then suspends the radiation of electric wave for 5 seconds, during which the wireless tag reader/writer A checks if the other wireless tag reader/writer, or the wireless tag reader/writer B, starts radiating an electric wave or not. If the wireless tag reader/writer B starts radiating an electric wave, the wireless tag reader/writer A does not restart radiating an electric wave. The wireless tag reader/writer A restarts radiating an electric wave only after the wireless tag reader/writer B stops radiating an electric wave.

If the wireless tag reader/writer B starts radiating an electric wave during the 5 seconds for which the wireless tag reader/writer A suspends the radiation of electric wave, the wireless tag reader/writer A cannot restart radiating an electric wave for 5 seconds. As the number of wireless tag readers/writers increases, the time period during which the wireless tag reader/writer A cannot restart radiating an electric wave may be extended further. The wireless tag readers/writers will not be effectively exploited when the wireless tag reader/writer A is frequently operated whereas the wireless tag reader/writer B is operated only rarely.

FIG. 3C is a graph illustrating the time intervals of radiation of electric waves when two wireless tag readers/writers A and B of the wireless tag reader/writer control system of this embodiment are operating. As seen from FIG. 3C, the wireless tag reader/writer control system of this embodiment operates so as to reduce the time span authorized to radiate an electric wave at a time of the wireless tag reader/writer B when the latter is operated less frequently.

With this arrangement, the time intervals for which the wireless tag reader/writer A cannot restart radiating an electric wave at a time is reduced to 1 second.

Outline of Processing Operation

With the wireless tag reader/writer control system of this embodiment, the control apparatus 101 transmits the execution of radiation time intervals of each of the wireless tag readers/writers 120, 130 to the corresponding one of the wireless tag readers/writers 120, 130 and each of the wireless tag readers/writers 120, 130 stores the execution of radiation time intervals it receives in the reader/writer side execution table 122 so that each of the wireless tag readers/writers 120, 130 radiates an electromagnetic wave according to the stored time intervals.

The operation of the wireless tag reader/writer control system of this embodiment may be arranged in a manner as described below. The execution table 105 stores the execution of radiation time intervals of each clock time zone and the control apparatus 101 reads out the execution of radiation time intervals in each clock time zone for each of the wireless tag readers/writers from the execution table 105 and transmits the execution of radiation time intervals of each of the wireless tag readers/writers 120, 130 to the corresponding one of the wireless tag readers/writers 120, 130. Then, each of the wireless tag readers/writers 120, 130 stores the execution of radiation time intervals it receives in the reader/writer side execution table and radiates an electromagnetic wave according to the stored execution of radiation time intervals.

With the wireless tag reader/writer control system of this embodiment, the control apparatus 101 may additionally have a count table 106 for storing the number of the wireless tags each of the wireless tag readers/writers 120, 130 has read. Then, the operation of the wireless tag reader/writer control system may be arranged in a manner as described below. Each of the wireless tag readers/writers 120, 103 transmits the number of wireless tags it has read and the control apparatus 101 updates the count table 106 according to the number it receives. When the number stored in the count table 106 for either of the wireless tag readers/writers 120, 130 exceeds a predetermined threshold value, the control apparatus increases the duration of each of the time intervals of radiations of electromagnetic wave for the corresponding wireless tag reader/writer 120 or 130, updates the execution of radiation time intervals of each of the wireless tag readers/writers 120, 130 and transmits the updated time intervals to the wireless tag readers/writers 120, 130. Then, the wireless tag readers/writers 120, 130 receive the execution of radiation time intervals and store them in the respective reader/writer side execution table 122. Thus, the each of the wireless tag readers/writers 120, 130 radiates an electromagnetic wave according to the stored execution of radiation time intervals.

With the wireless tag reader/writer control method of this embodiment, the control apparatus 101 of the wireless tag reader/writer control system of the embodiment transmits the execution of radiation time intervals of each of the wireless tag readers/writers 120, 130 to the corresponding one of the wireless tag readers/writers 120, 130 and each of the wireless tag readers/writers 120, 130 stores the execution of radiation time intervals it receives in the reader/writer side execution table 122 so that each of the wireless tag readers/writers 120, 130 radiates an electromagnetic wave according to the stored time intervals.

With the wireless tag reader/writer control method of this embodiment, the operation of the wireless tag reader/writer control system of the embodiment may be arranged in a manner as described below. The execution table 105 stores the execution of radiation time intervals of each clock time zone and the control apparatus 101 reads out the radiation time intervals in each clock time zone for each of the wireless tag readers/writers from the execution table 105 and transmits the execution of radiation time intervals of each of the wireless tag readers/writers 120, 130 to the corresponding one of the wireless tag readers/writers 120, 130. Then, each of the wireless tag readers/writers 120, 130 stores the execution of radiation time intervals it receives in the reader/writer side execution table and radiates an electromagnetic wave according to the stored execution of radiation time intervals.

With the wireless tag reader/writer control method of this embodiment, the operation of the wireless tag reader/writer control system of the embodiment may be arranged in a manner as described below. The control apparatus 101 additionally has a count table 106 for storing the number of the wireless tags each of the wireless tag readers/writers 120, 130 has read. Then, each of the wireless tag readers/writers 120, 103 transmits the number of wireless tags it has read and the control apparatus 101 updates the count table 106 according to the number it receives. When the number stored in the count table 106 for either of the wireless tag readers/writers 120, 130 exceeds a predetermined threshold value, the control apparatus 101 increases the duration of each of the time intervals of radiations of electromagnetic wave for the corresponding wireless tag reader/writer 120 or 130, updates the execution of radiation time intervals of each of the wireless tag readers/writers 120, 130 and transmits the updated time intervals to the wireless tag readers/writers 120, 130. Then, the wireless tag readers/writers 120, 130 receive the execution of radiation time intervals and store them in the respective reader/writer side execution table 122. Thus, the each of the wireless tag readers/writers 120, 130 radiates an electromagnetic wave according to the stored execution of radiation time intervals.

Configuration of Each Table

Figure 4:
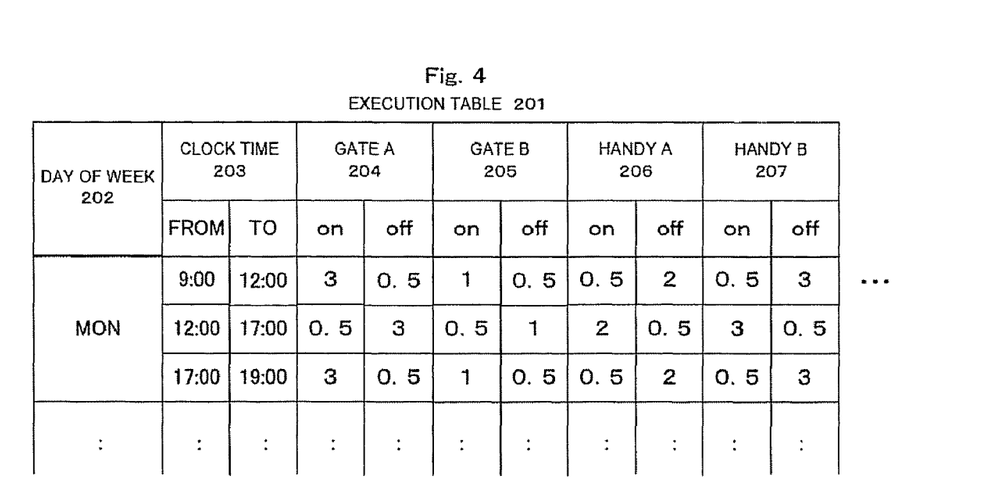
FIG. 4 is a schematic illustration of exemplar data that may be stored in an execution table.

FIG. 4 is a schematic illustration of data that may be stored in an execution table 201 for the purpose of the present invention. Referring to FIG. 4, the execution table 201 stores the days of the week 202, the starting clock times FROM of time zones 203 and the ending clock times TO of time zones 203, the time spans "on" authorized respectively to radiate an electric wave and the time intervals "off" of not radiating electric wave for gate A204, gate B205, handy A and handy B that are wireless tag readers/writers.

The illustrated examples of data include "Mon" for the days of the week 202, "9:00" for the starting clock times FROM, "12:00" for the ending clock times TO of time zones 203 and "3" and "0.5" respectively for "on" and "off" of the gate A204. As shown in FIG. 4, the execution of radiation time intervals of electric wave is stored for each time zone and each wireless tag reader/writer.

Figure 5:
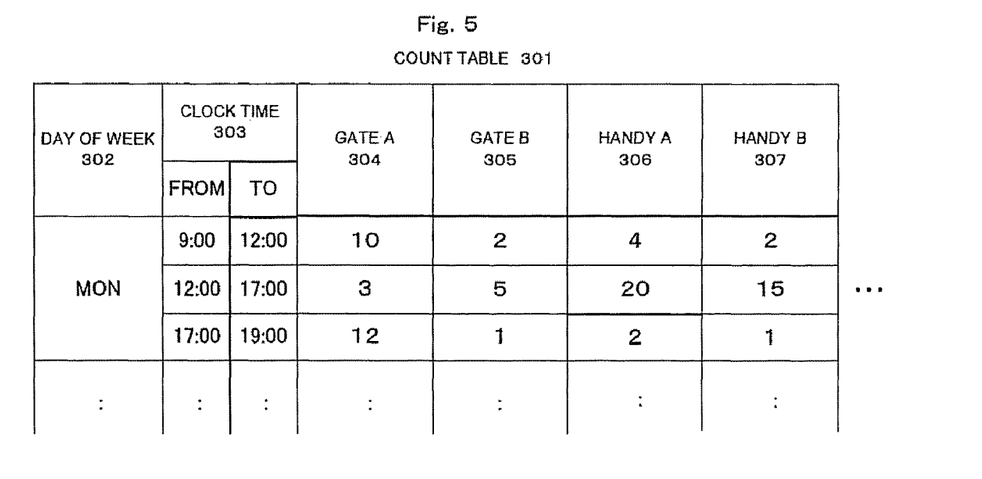
FIG. 5 is a schematic illustration of exemplar data that may be stored in a count table.

FIG. 5 is a schematic illustration of exemplar data that may be stored in a count table 301 for the purpose of the present invention. Referring to FIG. 5, the count table 301 stores the days of the week 302, the starting clock times FROM of time zones 303 and the ending clock times TO of time zones 303 and the number of tags that gate A304, gate B305, handy A and handy B that are wireless tag readers/writers have respectively read in.

The illustrated examples of data include "Mon" for the days of the week 302, "9:00" for the starting clock times FROM, "12:00" for the ending clock times TO of time zones 303 and "10" for the number of wireless tag that the gate A304 has read in. As shown in FIG. 5, the number of read in wireless tags is stored for each time zone and each wireless tag reader/writer.

Figure 6:
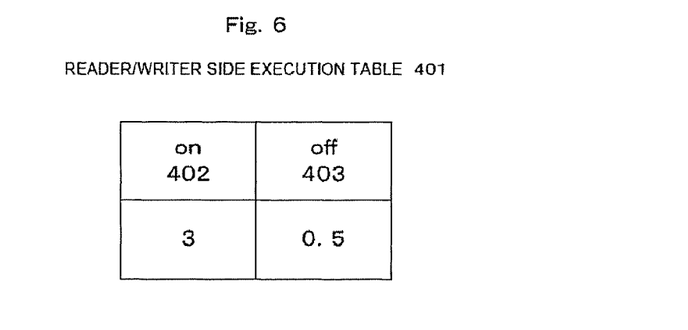
FIG. 6 is schematic illustration of exemplar data that may be stored in a reader/writer side execution table.

FIG. 6 is schematic illustration of exemplar data that may be stored in a reader/writer side execution table 401. Referring to FIG. 6, the reader/writer side execution table 401 stores the time span "on" authorized to radiate an electric wave and the time intervals "off" of not radiating electric wave. The illustrated example of data includes "3" for "on" and "0.5" for "off".

Control of Time Span Authorized to Radiate Electric Wave by Clock Time

Figure 7:
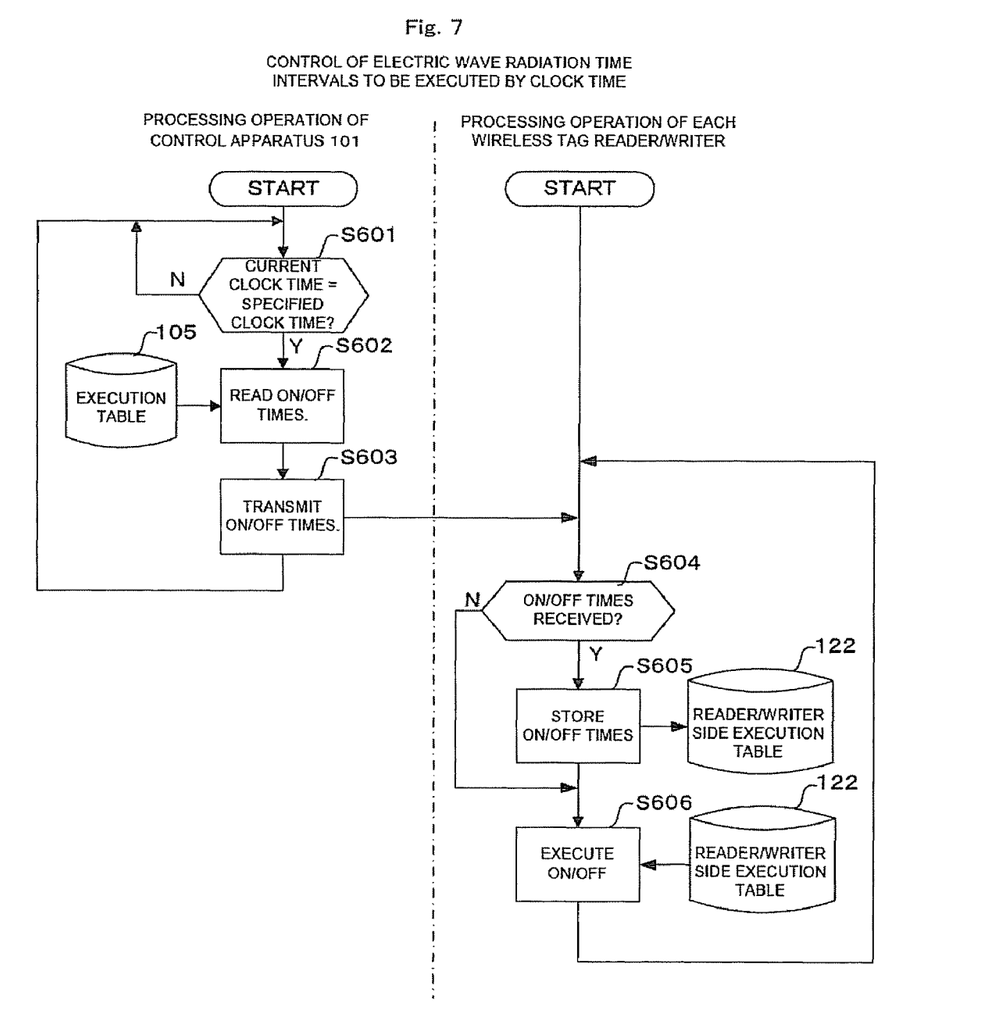
FIG. 7 is a flowchart of the process of controlling the time span authorized to radiate an electromagnetic wave on the basis of clock time.

Now, the control of the time span authorized for each wireless tag reader/writer to radiate an electric wave by clock time of the wireless tag reader/writer control system of this embodiment will be described below. FIG. 7 is a flowchart of the process of controlling electric wave radiation time intervals to be executed on the basis of clock time. The control operation will be described by referring to FIG. 7 below.

(Processing Operation of Control Apparatus 101)

In Step S601, the control apparatus 101 determines if the current clock time is the specified clock time or not. The specified clock time is the stored clock time FROM of time zone 203 in the execution table 105. If the current clock time is not the specified clock time, the control apparatus 101 returns to Step S601. If, on the other hand, the current clock time is the specified clock time, the control apparatus 101 proceeds to Step S602.

In Step S602, the control apparatus 101 reads in the "on" time and the "off" time of each of the wireless tag readers/writers for the specified clock time, which is the time span authorized to radiate an electromagnetic wave, from the execution table 105.

In Step S603, the control apparatus 101 transmits the time spans authorized to radiate an electromagnetic wave to the wireless tag readers/writers.

(Processing Operation of Each Wireless Tag Reader/Writer)

In Step S604, each of the wireless tag readers/writers 120, 130 determines if it receives the time span authorized to radiate an electromagnetic wave or not from the control apparatus 101. If each of the wireless tag readers/writers 120 receives the time span authorized to radiate an electromagnetic wave, it proceeds to Step S605. If, on the other hand, it does not receive the time span, it proceeds to Step S606.

In Step S605, each of the wireless tag readers/writers 120, 130 stores the time span authorized to radiate an electromagnetic wave it receives in the reader/writer side execution table 122.

In Step S606, each of the wireless tag readers/writers 120, 130 executes "on" and "off", or starts and stops radiating an electric wave according to the time span authorized to radiate an electric wave.

Figure 8:
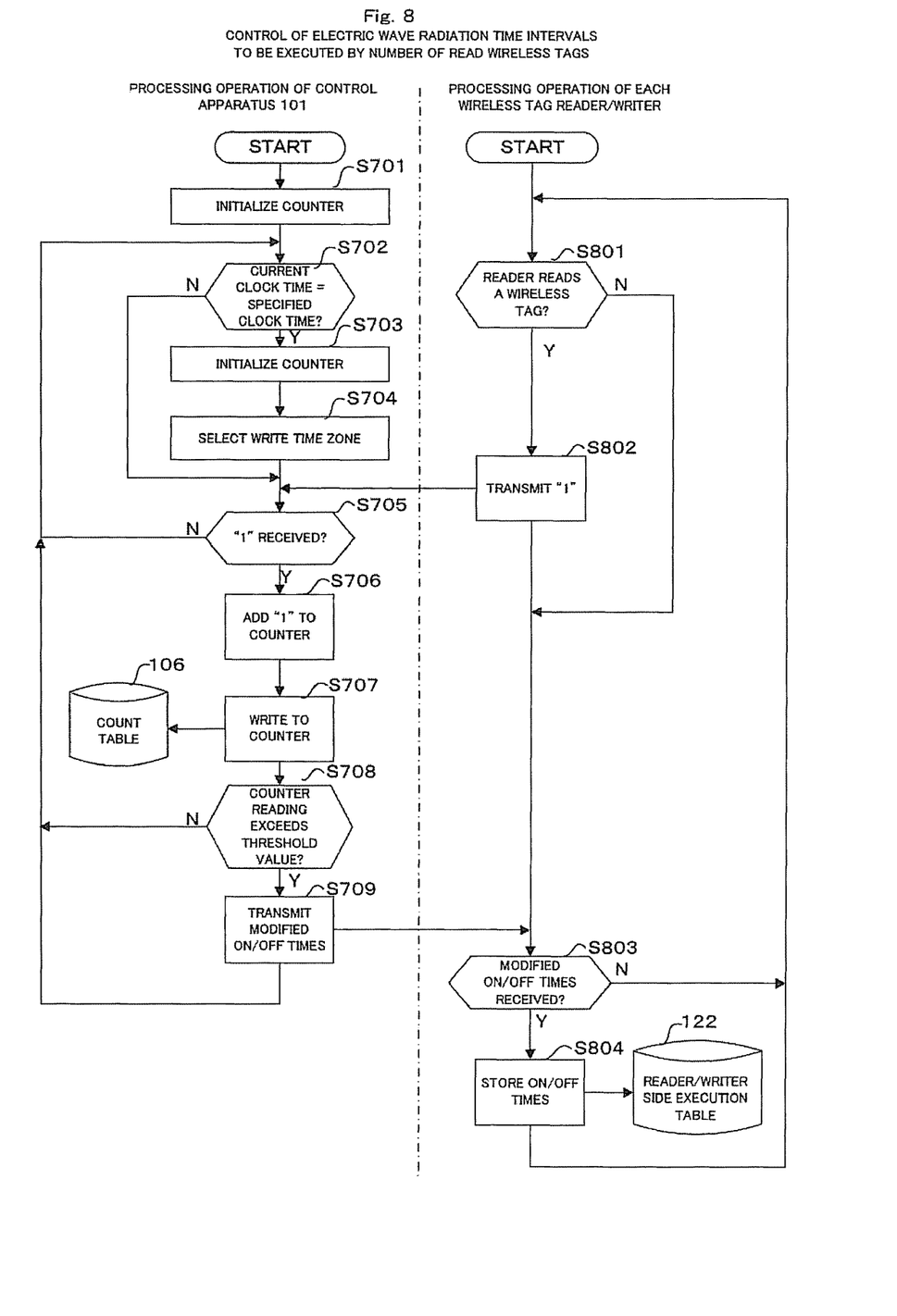
FIG. 8 is a flowchart of the process of controlling the time span authorized to radiate an electromagnetic wave on the basis of the number of read in wireless tags.

Control of Time Span Authorized to Radiate Electric Wave by Number of Read in Wireless Tags Now, the control of the time span authorized for each wireless tag reader/writer to radiate an electric wave by the number of read in wireless tags of the wireless tag reader/writer control system of this embodiment will be described below. FIG. 8 is a flowchart of the process of controlling the time span authorized to radiate an electric wave on the basis of the number of read in wireless tags. The control operation will be described by referring to FIG. 8 below.

(Processing Operation of Control Apparatus 101)

In Step S701, the control apparatus 101 initializes all the counters stored in the memory for each of the wireless tag readers/writers to "0". In Step S702, the control apparatus 101 determines if the current clock time is the specified clock time or not. If the current clock time is not the specified clock time, the control apparatus 101 returns to Step S702. If, on the other hand, the current clock time is the specified clock time, the control apparatus 101 proceeds to Step S703.

In Step S703, the control apparatus 101 initializes all the counters stored in the memory for each of the wireless tag readers/writers to "0". In Step S704, the control apparatus 101 selects the specified clock time that agrees with the current clock time for the write time zone for which the counter reading is to be updated.

In Step S705, the control apparatus 101 determines if it receives "1" from each of the wireless tag readers/writers 120, 130 each time the wireless tag reader/writer reads in a wireless tag or not. The control apparatus 101 proceeds to Step S706 when it receives "1", whereas it returns to Step S702 when it does not receive "1".

In Step S706, the control apparatus 101 increments the reading of the counter of the wireless tag reader/writer that transmits "1" by "1". In Step S707, the control apparatus 101 stores the numerical value stored in the counter to the address of the wireless tag reader/writer that corresponds to the write time zone in the count table.

In Step S708, the control apparatus 101 determines if the numerical value it writes in the count table exceeds the predetermined threshold value or not. The threshold value may be defined as "20" in advance for example. If the numerical value exceeds the threshold value, it means that the corresponding one of the wireless tag readers/writers 120, 130 reads in wireless tags more than expected.

The control apparatus 101 proceeds to Step S709 when it determines that the written numerical value exceeds the threshold value, whereas it returns to Step S702 when it determines that the written numerical value does not exceed the threshold value.

In Step S709, the control apparatus 101 transmits the modified on/off clock times, or the increased time span authorized to radiate an electromagnetic wave, to the wireless tag reader/writer or each of the wireless tag readers/writers 120, 130 whose read in numerical value exceeds the predetermined threshold value and then returns to Step S702.

(Processing Operation of Each Wireless Tag Reader/Writer)

In Step S801, each of the wireless tag readers/writers 120, 130 determines if it reads in a wireless tag or not. If each of the wireless tag readers/writers 120, 130 reads in a wireless tag, it proceeds to Step S802. If, on the other hand, it does not read in any wireless tag, it proceeds to Step S803.

In Step S802, each of the wireless tag readers/writers 120, 130 transmits "1" to the control apparatus 101.

In Step S803, each of the wireless tag readers/writers 120, 130 determines if it receives the modified on/off clock times from the control apparatus 101 or not. If each of the wireless tag readers/writers 120, 130 receives the modified on/off clock times, it proceeds to Step S804, whereas it returns to Step S801 when it does not receive the modified on/off clock times.

In step S804, each of the wireless tag reader/writer 120, 130 stores the modified on/off clock times it receives in the reader/writer side execution table 122. If, on the other hand, each of the wireless tag reader/writer 120, 130 does not receive the modified on/off clock times, it returns to Step S801

Then, each of the wireless tag readers/writers 120, 130 radiates an electric wave according to the modified on/off clock times as described above under <control of time span authorized to radiate electromagnetic wave by clock time>.

Applications

The wireless tag reader/writer control system of this embodiment may be so arranged that, when the control apparatus 101 determines that the number of wireless tags that is read in and stored in the count table 106 for each of the wireless tag readers/writers exceeds a predetermined threshold value, it stores an increased time span authorized to radiate an electromagnetic wave in the execution table 105 for the wireless tag reader/writer that has read in a number of wireless tags exceeding the threshold value.

With this arrangement, it is no longer necessary to manually update the execution table 105.

The count table 106 may be arranged so as to store a threshold value for each of the days of the week and for each of the time zones.

With this arrangement, the control apparatus 101 can finely modify the time span authorized to radiate an electromagnetic wave for each wireless tag reader/writer.

The wireless tag reader/writer control system of this embodiment may be so arranged that, when the control apparatus 101 determines that the number of wireless tags that is read in and stored in the count table 105 for each of the wireless tag readers/writers exceeds a predetermined threshold value, it stores an increased time span authorized to radiate an electromagnetic wave in the execution table 105 for the wireless tag reader/writer that has read in a number of wireless tags exceeding the threshold value.

With this arrangement, the time span authorized for radiating an electromagnetic wave of each wireless tag reader/writer can be automatically modified by using a threshold value.

The wireless tag reader/writer control system of this embodiment may be so arranged that, when the control apparatus 101 determines that the number of wireless tags that is read in and stored in the count table 105 for each of the wireless tag readers/writers exceeds a predetermined threshold value, it modifies the threshold value and stores the modified threshold value in the count table 106.

With this arrangement, the threshold value can be automatically updated.

Advantages of the Embodiment

As described above in detail, a wireless tag reader/writer control system and a wireless tag reader/writer control method according to the present embodiment alter the time span authorized to radiate an electric wave for each wireless tag reader/writer. Therefore, the present invention provides an advantage of preventing a plurality of wireless tag readers/writers being operated within a limited geographical area from causing interferences of electric waves. Then, as a result, a large number of wireless tag readers/writers can be operated efficiently.

Potentials of Embodying the Present Invention

The present invention is by no means limited to the above-described embodiment, any of the components of which may be modified and altered in various different ways without departing from the scope of the present invention. Additionally, any of the components of the above-described embodiment may be combined in various different ways to produce different embodiments of the present invention. For instance, some of the components of the above-described embodiment may be omitted. Components of different embodiments of the present invention may be appropriately combined.

Although exemplary embodiments of the present invention have been shown and described, it will be apparent to those having ordinary skill in the art that a number of changes, modifications or alternations to the invention as described herein may be made, none of which depart from the spirit of the present invention. All such changes, modifications and alternations should therefore be seen as within the scope of the present invention.

What is claimed is:

1. A wireless tag reader/writer control system including:
a control apparatus for transmitting signals to and receiving signals from a plurality of wireless tag readers/writers, the control apparatus having an execution table storing an electromagnetic wave radiation execution timing arrangement including the time span authorized to radiate an electric wave at a time and the radiation time intervals between radiations of electric wave for each of the wireless tag readers/writers for each clock hour, and having a count table for storing the number of wireless tags each of the wireless tag readers/writers reads in each clock hour; and
a plurality of wireless tag readers/writers, each having a reader/writer main body for transmitting a signal to and receiving a signal from a wireless tag and transmitting a signal to and receiving a signal from the control apparatus and a reader/writer side execution table storing the execution of radiation time intervals between radiations of electric wave for a wireless tag;
the control apparatus being adapted to transmit the execution of radiation time intervals between radiations of electric wave to each of the wireless tag readers/writers;
each of the wireless tag readers/writers being adapted to store the received execution of radiation time intervals in the reader/writer side execution table;
each of the wireless tag readers/writers being adapted to radiate an electromagnetic wave according to the stored execution of radiation time intervals;
each of the wireless tag readers/writers transmits the read number that is the number of wireless tag it reads to the control apparatus; whereas
the control apparatus updates the count table according to the received read number;
so that, when the control apparatus determines that the read number stored in the count table exceeds a predetermined threshold value for any of the wireless tag readers/writers, it transmits the execution of radiation time intervals modified by increasing the time span authorized to radiate an electromagnetic wave to the wireless tag reader/writer or each of the wireless tag readers/writers having a read number exceeding the predetermined threshold value; while the wireless tag reader/writer or each of the wireless tag readers/writers stores the received execution of radiation time intervals in the reader/writer side execution table; and
each of the wireless tag readers/writers radiates an electromagnetic wave according to the stored execution of radiation time intervals.

2. The system according to claim 1, wherein
the execution table stores the execution of radiation time intervals for each day of the week and for each clock hour.

3. The system according to claim 1, wherein
the count table stores the read number for each day of the week and for each clock hour.

4. The system according to claim 1, wherein,
when the control apparatus determines that the read number stored in the count table exceeds a predetermined threshold value for any of the wireless tag readers/writers, it stores the execution of radiation time intervals modified by increasing the time span authorized to radiate an electromagnetic wave in the execution table for the wireless tag reader/writer or each of the wireless tag readers/writers.

5. The system according to claim 1, wherein
the count table stores the threshold value for each day of the week and for each clock hour.

6. The system according to claim 1, wherein
when the control apparatus determines that the read number stored in the count table exceeds a predetermined threshold value for any of the wireless tag readers/writers, it modifies the threshold value.

7. The system according to claim 5, wherein
when the control apparatus determines that the read number stored in the count table exceeds a predetermined threshold value for any of the wireless tag readers/writers, it modifies the threshold value and stores the modified value in the count table.

8. A wireless tag reader/writer control method to be used for a wireless tag reader/writer control system including:
a control apparatus for transmitting signals to and receiving signals from a plurality of wireless tag readers/writers, the control apparatus having an execution table storing an electromagnetic wave radiation execution timing arrangement including the time span authorized to radiate an electric wave at a time and the radiation time intervals between radiations of electric wave for each of the wireless tag readers/writers for each clock hour, and having a count table for storing the number of wireless tags each of the wireless tag readers/writers reads in each clock hour; and
a plurality of wireless tag readers/writers, each having a reader/writer main body for transmitting a signal to and receiving a signal from a wireless tag and transmitting a signal to and receiving a signal from the control apparatus and a reader/writer side execution table storing the execution of radiation time intervals between radiations of electromagnetic wave for a wireless tag;
the control apparatus being adapted to transmit the execution of radiation time intervals to each of the wireless tag readers/writers to have the wireless tag reader/writer store the received execution of radiation time intervals in the reader/writer side execution table, and have each of the wireless tag readers/writers radiate an electromagnetic wave according to the stored execution of radiation time intervals;

each of the wireless tag readers/writers transmits the read number that is the number of wireless tag it reads to the control apparatus; whereas the control apparatus updates the count table according to the received read number;

so that, when the control apparatus determines that the read number stored in the count table exceeds a predetermined threshold value for any of the wireless tag readers/writers, it transmits the execution of radiation time intervals modified by increasing the time span authorized to radiate an electromagnetic wave to the wireless tag reader/writer or each of the wireless tag readers/writers having a read number exceeding the predetermined threshold value; while the wireless tag reader/writer or each of the wireless tag readers/writers stores the received execution of radiation time intervals in the reader/writer side execution table; and each of the wireless tag readers/writers radiates an electromagnetic wave according to the stored execution of radiation time intervals.

9. The method according to claim 8, wherein
the execution table stores the execution of radiation time intervals for each day of the week and for each clock hour.

10. The method according to claim 8, wherein
the count table stores the read number for each day of the week and for each clock hour.

11. The method according to claim 8, wherein,
when the control apparatus determines that the read number stored in the count table exceeds a predetermined threshold value for any of the wireless tag readers/writers, it stores the execution of radiation time intervals modified by increasing the time span authorized to radiate an electromagnetic wave in the execution table for the wireless tag reader/writer or each of the wireless tag readers/writers.

12. The method according to claim 8, wherein
the count table stores the threshold value for each day of the week and for each clock hour.

13. The method according to claim 8, wherein
when the control apparatus determines that the read number stored in the count table exceeds a predetermined threshold value for any of the wireless tag readers/writers, it modifies the threshold value.

14. The method according to claim 12, wherein
when the control apparatus determines that the read number stored in the count table exceeds a predetermined threshold value for any of the wireless tag readers/writers, it modifies the threshold value and stores in the count table.

* * * * *